UNITED STATES PATENT OFFICE.

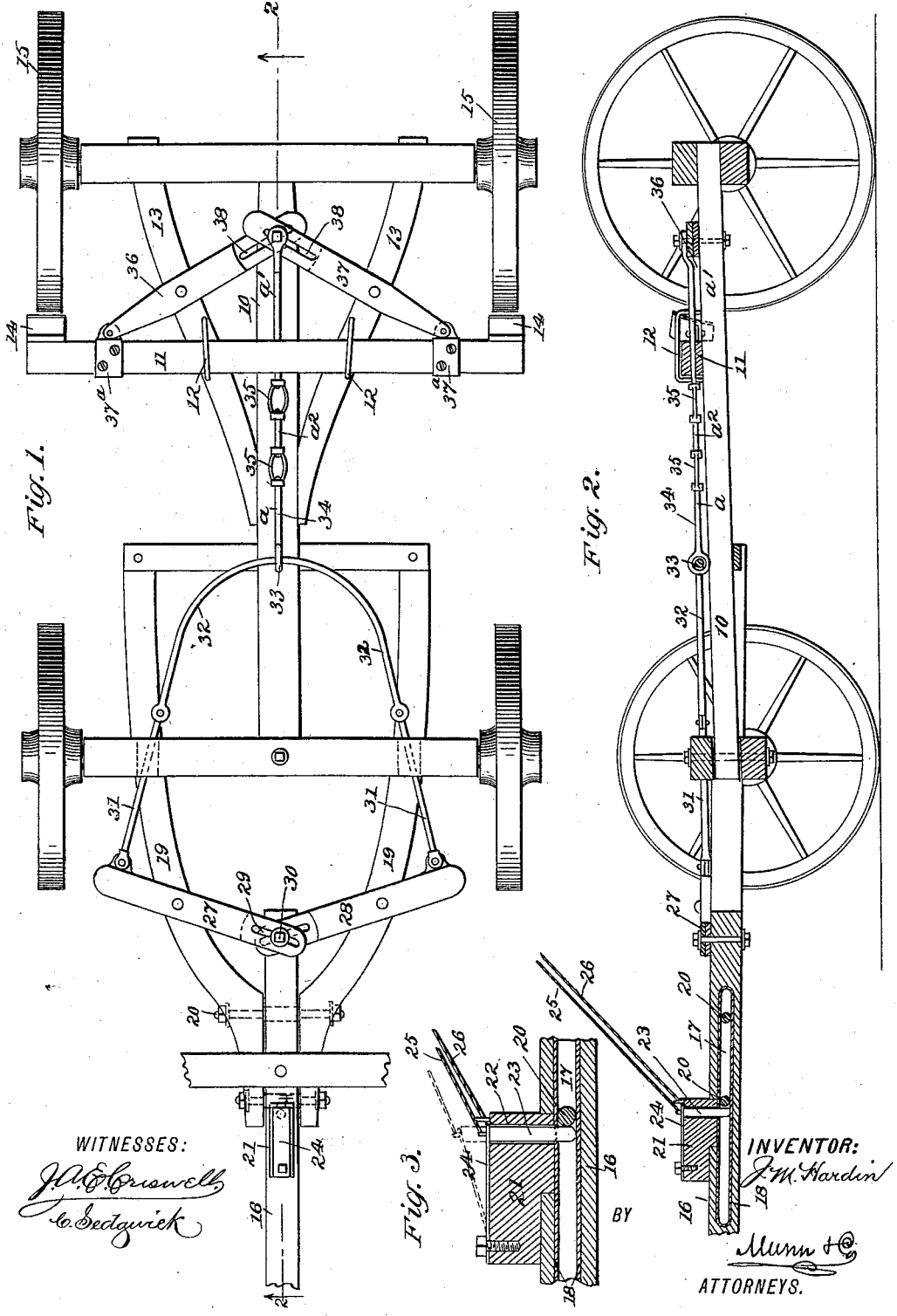

JOHN M. HARDIN, OF GEST, KENTUCKY.

VEHICLE-BRAKE.

SPECIFICATION forming part of Letters Patent No. 414,904, dated November 12, 1889.

Application filed August 22, 1889. Serial No. 321,609. (No model.)

*To all whom it may concern:*

Be it known that I, JOHN M. HARDIN, of Gest, in the county of Henry and State of Kentucky, have invented a new and useful Improvement in Vehicle-Brakes, of which the following is a full, clear, and exact description.

My invention relates to an improvement in vehicle-brakes, and has for its object to provide a means whereby the brake will be applied to the wheels of a vehicle and removed therefrom by the team, the brakes being applied when the team backs and removed the moment the team starts forward; and a further object of the invention is to provide a means whereby the brake may be held out of contact with the wheels when the vehicle is to be backed, and to accomplish the above result with simple and durable mechanism capable of application to any vehicle.

The invention consists in the novel construction and combination of the several parts, as will be hereinafter fully set forth, and pointed out in the claims.
Reference is to be had to the accompanying drawings, forming a part of this specification, in which similar letters and figures of reference indicate corresponding parts in all the views.
Figure 1 is a plan view of a farm-wagon having the brake applied thereto. Fig. 2 is a section on line 2 2 of Fig. 1; and Fig. 3 is a vertical section through the rear slotted portion of the tongue or pole, illustrating the application of a stop-pin adapted to hold the brakes from the wheels when the vehicle is backed.

Upon the reach 10 a brake-bar 11 is held to slide transversely in any approved manner, being preferably guided by staples 12, or their equivalent, secured to the rear hounds 13. The brake-bar at each extremity is provided with a brake-shoe 14, adapted for contact with the rear wheels 15 of the vehicle.
In the tongue or pole 16, near the rear end, a longitudinal slot 17 is produced, to the walls of which slot I preferably attach a sheet-metal casing 18, and the slotted end of the tongue is passed between the forwardly-extending ends of the forward hounds 19, as shown in Fig. 1, and attached to the said hounds by passing bolts 20, or their equiv- alent, through the hounds and the slot 17 of the pole or tongue. The object of the metal casing 18 is to prevent the walls of the slot from wearing by frictional contact with the bolts 20. Near the forward end of the slot 17 a block 21 is secured upon the upper face of the tongue, as best shown in Figs. 2 and 3, in the rear end of which block a vertical aperture 22 is produced, leading into the tongue-slot 17, and in this aperture 22 a pin 23 is loosely fitted of sufficient length, when the upper end is flush with the upper face of the block 21, to extend far enough within the slot 17 at the lower end to contact with the forward bolt 20.

At the upper front end of the block 21 one end of a spring 24 is rigidly secured, which spring at its other end has attached thereto a rope or chain 25 of sufficient length to lead upward to the driver, who may at any time elevate the rear end of the spring, and the pin 23 is ordinarily provided with a similar rope or chain 26, which is also carried upward to the driver; but, if in practice it is found desirable, the pin 23 may be rigidly secured to the rear end of the spring 24, whereby when the said spring is elevated the pin is elevated also a sufficient distance to carry the lower end out of the tongue-slot 17.

Upon the upper, inner, or rear end of the tongue or pole 16 the ends of two links 27 and 28 are pivoted in such manner that they are capable of limited lateral movement. This is effected by causing one link to rest upon the other and producing in the contacting ends of each link a longitudinal slot 29, and through the slots of each link a bolt 30 is passed into and secured to the tongue, as best shown in Fig. 2.

To the inner edge of each link 27 and 28, at their outer extremities, one end of a rod 31 is pivotally attached, the said rods being made to pass rearwardly through openings in the forward axle to a pivotal connection with the extremities of a bow 32, which bow passes through an eye 33, formed upon the end of a rod 34, which rod extends rearwardly over the reach.

The reach-rod 34 is adapted to operate the brake-beam 11, and is usually made in two or more sections, preferably three—a front section $a$, a rear section $a'$, and a central section $a^2$. To the inner ends of the forward and rear sections $a$ and $a'$ a swivel 35 is secured, the central section $a^2$ being attached to each of the said swivels, as shown in Figs. 1 and 2. This sectional reach or brake-rod is provided in order that the wagon may be coupled in any desired length, and when the central section $a^2$ is very long suitable guide-staples may be secured to the reach through which the brake-bars pass.

Upon each of the rear hounds 13, between the rear axle and the brake-beam 11, links 36 and 37 are respectively fulcrumed near their centers, the forward ends of which links are pivoted to suitable clips or straps $37^a$, rigidly attached to the brake-beam near its ends.

The inner ends of the links 37 and 36 are adapted for contact, one link resting upon the other, and each of the contacting ends of the links 36 and 37 is provided with a longitudinal slot 38, and the rear end of the reach or brake bar 34 is attached to the slotted ends of the rear links by passing a bolt through the rod and the slots of the said links.

It will be observed that as soon as the horses start forward and draw upon the pole or tongue 16 the forward links will be contracted by reason of their pivotal ends being drawn forward, whereupon the bow 32 is also forced backward, and likewise the reach or brake bar 34, which, acting upon the rear links 36 and 37, causes the said links to contract by reason of their pivotal ends being also forced backward, whereby the brake-beam is carried away from the wheels, relieving them from contact with the brake-shoes. When the horses hold back, as in descending a hill or an inclination in the road, the reverse movement of the links and brake or reach bar takes place, whereupon the brake-shoes are forced in contact with the wheels and held in such contact until the team is started forward again to draw the vehicle.

When the operations above described take place, the pin 23 is held out of contact with the bolts 20, the normal position of said pin being shown in dotted lines in Fig. 3. By lowering the pin 23 while the brakes are applied it will pass down in rear of the bolt 20 and hold the brakes applied. When it is necessary to back the vehicle and not apply the brake in so doing, just before the team is backed and while the tongue is drawn forward, the pin 23 is permitted to drop down into the tongue-slot 17 and contact with the forward bolt 20, as shown in Figs. 2 and 3. By this means the tongue is prevented from being moved backward sufficiently to operate the links to apply the brakes.

Having thus described my invention, I claim as new and desire to secure by Letters Patent—

1. In a vehicle-brake, the combination, with a tongue capable of sliding between the forward hounds of the vehicle, a brake-beam provided with brake-shoes, and a brake-rod extending longitudinally above the reach-bar of the vehicle, of links pivoted to have lateral movement upon the inner end of the tongue, similar links pivoted to the rear end of the brake-rod and to the brake-shoe, and a bow-connection between the said brake-rod and the forward links, substantially as and for the purpose specified.

2. In a vehicle-brake, the combination, with a tongue capable of sliding between the forward hounds of the vehicle, a brake-beam provided with brake-shoes, and a brake-rod made in sections connected by swivels, the said brake-rod extending longitudinally above the reach-bar of the vehicle, of links pivoted to have lateral movement upon the inner end of the tongue, similar links pivoted to the rear end of the brake-rod and to the brake-shoes, and a bow-connection between the said brake-rod and the forward links, substantially as and for the purpose specified.

3. In a vehicle-brake, the combination, with a laterally-sliding tongue and a brake-beam provided with brake-shoes held to slide transversely upon the reach-bar of the vehicle, of links slotted at their inner ends and pivoted at said slotted ends to the tongue, a bowed rod located to the rear of the forward axle of the vehicle and pivotally connected to said links, a brake-rod attached to the bowed rod and extending rearward beyond the brake-beam, and links having slotted inner ends pivotally attached to the rear end of the said brake-rod and pivotally attached at their outer ends to the brake-beam, substantially as shown and described.

JOHN M. HARDIN.

Witnesses:
W. A. DIXON,
I. W. RIDGWAY.